UNITED STATES PATENT OFFICE

1,957,743

PRODUCTION OF HYDROGEN

Gustav Wietzel, Wilhelm Haller, and William Hennicke, Ludwigshafen-on-the-Rhine, Germany, assignors to I. G. Farbenindustrie Aktiengesellschaft, Frankfort-on-the-Main, Germany, a corporation of Germany No Drawing. Application June 25, 1927, Serial No. 201,558. In Germany June 26, 1926

4 Claims. (Cl. 48—197)

This invention relates to the production of hydrogen or gas mixtures containing hydrogen.

We have found that such gases can be produced in a particularly advantageous manner by partially burning gaseous hydrocarbons, or mixtures containing the same in the presence of only so much of a gas richer in free oxygen than atmospheric air, that is oxygen, or air mixed with oxygen, and if desired with an addition of water vapor, that the reaction mixture still contains an appreciable amount of hydrocarbons, especially methane, and then converting the carbon monoxid formed by the partial combustion and the remainder of the hydrocarbons by means of steam into carbon dioxide and hydrogen by passing the reaction mixture, after the addition of steam if not already present in an amount sufficient for the said conversion, over activated catalysts, and if necessary removing the resulting carbon dioxid.

The partial combustion may be effected by means of a naked flame, or in the form of surface combustion by the employment of solid bodies and, contingently, in the presence of catalysts which may, for example, be deposited on the said solid bodies.

It is sometimes of advantage to burn, at first, only a portion of the gaseous hydrocarbons or gas mixture containing same to be treated by branching off part of the gas and burning this part with oxygen, or air, rich in oxygen, contingently in the presence of steam, to such an extent that the products of combustion still contain appreciable proportions of hydrocarbon, or hydrocarbons, or that the whole of the hydrocarbon, or hydrocarbons contained in said branched off portion has been transformed into carbon monoxide, or the combustion has been carried still further to a partial or even complete conversion of the hydrocarbons into carbon dioxid and hydrogen, and then to mix the resulting reaction mixture with the untreated remainder of the hydrocarbon, or hydrocarbons, or original gas containing the same, steam being then added, unless already present in sufficent amount, and to convert the whole mixture afterwards into carbon dioxid and hydrogen by passing it over activated catalysts, such as nickel or nickel oxid, activated by aluminum oxid or magnesium oxid. The gases containing hydrocarbons, and, advantageously, also the medium reacting therewith, such as steam, air and oxygen, are preferably preheated, to as high a temperature as possible, which may be effected, for example, by heat exchange with the gases obtained by the process. Occasionally it may also be advantageous to employ several catalysts in the second stage, for example, a less active but heat-resisting catalyst such as nickel on fireproof material in the front, hot portion of the contact mass; and in the rear and less hot portion a highly active catalyst such as nickel activated by aluminum oxid or magnesium oxid which is less resistant to high temperature, which latter catalyst transforms the remainder of the methane. In many instances it is also advisable to employ, in the rear layer, such catalysts as accelerate the decomposition of the hydrocarbons by steam into carbon monoxid and hydrogen, and at the same time the conversion of carbon monoxid, by steam, into hydrogen and carbon dioxide, for example activated nickel-iron catalysts. Or there may also be used for this purpose a mixture of two catalysts, each of which effects one of the said transformations, such as a mixture of an activated nickel catalyst with an iron-chromium catalyst. In this way the heat developed by the reaction $$CO + H_2O = CO_2 + H_2$$

is rendered available for furthering the endothermic reaction $$CH_4 + H_2O = CO + 3H_2$$

When gas mixtures containing, in addition to hydrogen, considerable amounts of carbon monoxid are to be produced, the second stage of the process must be carried out in such a manner that practically no reaction takes place between the carbon monoxid and the steam, whereupon if necessary, the carbon dioxid is removed. The removal of carbon dioxide from the gas mixture may be effected by any means absorbing carbon dioxide, preferably by passing the said mixture through water maintained at an elevated pressure. In order to avoid conversion between carbon monoxide and hydrogen, preferably only a small amount of water vapor or no water vapor at all is added in the second stage, and the operation is carried out in the absence of such catalysts, as facilitate the conversion of the carbon monoxid with the water vapor, which may be present, into carbon dioxid and hydrogen. For example, catalysts containing iron should not be employed. The mixtures of hydrogen and carbon monoxid thus obtained may be employed, for instance, in the catalytic production of methanol, iso-butyl alcohol, liquid hydrocarbons and the like.

Other gases such as water gas and the like, may further be added to either the original gases containing hydrocarbons, or the gas mixture resulting from process herein described.

As stated above, the first stage of the present process consists in converting gaseous hydrocarbons or gas mixtures containing the same to a considerable portion into mixtures of carbon monoxid and hydrogen, by treating them with oxygen or air enriched in oxygen with or without water vapor, if desired in the presence of catalysts. This operation has the disadvantage that when gases containing sulfur are employed, a conversion with a fairly satisfactory yield usually takes place only at comparatively high temperatures of from 900° to 1000° C., unless very large amounts of the catalyst are employed. However, the reaction can be made to take place at lower temperatures, if not only the inorganic, but also the organic compounds of sulfur are for the most part removed from the initial gases. This can be effected for instance, by passing the gas over a metallic mass, which absorbs the compounds of sulfur, or over a contact substance which converts the organic sulfur compounds into hydrogen sulfid, which can then be removed in any known or suitable manner. For example in the case of illuminating gas freed from benzol and hydrogen sulfide, this removal of sulfur compounds may be effected by passing the gas, after being saturated with water vapor, at 400° C. over activated iron oxid and subsequently removing the hydrogen sulfide thereby formed by means of active charcoal. With this purified gas the incomplete combustion may be effected at temperatures as low as 600° C., whereas with unpurified gas temperatures of about 1000° C. are necessary.

The first stage of the present process has been described above as being carried out by subjecting the hydrocarbons to an incomplete combustion by oxygen or air enriched in oxygen, with or without the addition of water vapor. In some cases, however, it may be advantageous to carry out the said first stage in a modified manner as follows:

The hydrocarbons or mixtures containing the same are subjected to thermal decomposition, if necessary in the presence of catalysts, in such a manner, that carbon is deposited, and the reaction product still contains an appreciable amount of hydrocarbons. The heating may be either direct or indirect or according to both methods combined. For instance, the hydrocarbons may be passed through externally heated tubes; the carbon produced may be collected in dust separating chambers and can be employed for those purposes to which carbon-black is usually put, or as fuel for the external heating in the process. The process may also be operated for example discontinuously without external heating, by passing the hydrocarbon, or hydrocarbons, over hot fire-proof materials. After some time, the supply of hydrocarbons is turned off, and hot combustion gases or air are passed over the said fire-proof materials, whereby the gases burn the carbon, which has been deposited and thus reheat the fire-proof materials. If the operation is carried out in this way, it is advantageous to employ two or more decomposition plants, working in different phases. The thermal decomposition may in some cases be facilitated by the addition of other gases and vapors, such as steam or carbon dioxid or restricted amounts of air or oxygen or several of these agents.

The gases thus obtained are then passed, if necessary after the addition of steam or carbon dioxid or oxygen or air or several of these agents over activated catalysts which, in case the carbon monoxid is to be converted with the aid of steam into carbon dioxid and hydrogen, bring about this reaction at least in the latter part of the apparatus.

The following examples will further illustrate how this invention may be carried out in practice, but the invention is not limited to these examples.

Example 1

44 cubic metres of coal gas containing about 30 per cent of hydrocarbons are partially burned with 11 cubic metres of oxygen, with the addition of 12 kilograms of steam, a gas mixture containing about 8 per cent of $CO_2$, 60 per cent of $H_2$, 19 per cent of CO, 7 per cent of $CH_4$, and 6 per cent of $N_2$ being formed. This mixture is passed along with 18 kilograms of steam over a heated nickel catalyst activated with aluminium oxid, the final layer of which is mixed with a catalyst containing iron and chromium oxid, to convert the carbon monoxid by means of steam into hydrogen and carbon dioxid. The reaction mixture issues from the contact chamber with a temperature of about 600° C. and contains about 20 per cent of carbon dioxid, 72 per cent of hydrogen, 3.6 per cent of carbon monoxid, 0.4 per cent of methane and 4 per cent of nitrogen.

Example 2

By the incomplete combustion of 100 cubic metres of illuminating gas with 25 cubic metres of oxygen with the addition of 8 kilograms of steam, a gas mixture containing 8 per cent of carbon dioxid, 60 per cent of hydrogen, 19 per cent of carbon monoxid, 7 per cent of methane and 6 per cent of nitrogen is obtained. This mixture is passed over an activated nickel catalyst at 900° C. and a gas containing 7 per cent of carbon dioxid, 66 per cent of hydrogen, 21 per cent of carbon monoxid, 0.8 per cent of methane and 5.2 per cent of nitrogen is thus obtained. By mixing 100 cubic metres of this gas with about 85 cubic metres of water gas containing approximately 5 per cent of carbon dioxid, 38 per cent of carbon monoxid, 48 per cent of hydrogen, 0.5 per cent of methane and 8.5 per cent of nitrogen, a gas is obtained which contains 6 per cent of carbon dioxid, 58 per cent of hydrogen, 29 per cent of carbon monoxid, 0.5 per cent of methane and 6.6 per cent of nitrogen and may be employed for the synthesis of methanol.

Example 3

Illuminating gas consisting of 2.2 per cent of carbon dioxid, 2.4 per cent of heavy hydrocarbons, 7.8 per cent of carbon monoxid, 51.3 per cent of hydrogen, 29.6 per cent of methane and 6.7 per cent of nitrogen is passed through a system of metal tubes filled with nickel on magnesia as a contact substance, which are maintained at a temperature of 900° C. with the aid of hot combustion gases. A gas mixture is obtained which has the following composition: 1.8 per cent of carbon dioxid, 6.4 per cent of carbon monoxid, 78.4 per cent of hydrogen, 7.9 per cent of methane and 5.5 per cent of nitrogen. This mixture, after 0.3 part of superheated steam for one part of the mixture has been added, is then passed over a heated activated nickel catalyst, with which in the final layer a catalyst for the conversion of carbon monoxid and steam into hydrogen and carbon dioxide containing iron and chromium oxid has been mixed.

The reaction mixture leaving the catalyst with a temperature of 600° C. contains 9.0 per cent of carbon dioxid, 2.6 per cent of carbon monoxid, 83.8 per cent of hydrogen, 0.5 per cent of methane and 4.1 per cent of nitrogen.

When it is desired to produce practically pure hydrogen from this mixture this may be effected by subjecting the latter to a washing process under pressure with water, the mixture thus freed from carbon dioxide then being washed with strongly cooled liquefied nitrogen in order to remove the other impurities contained in the hydrogen.

What we claim is:

1. The process of producing gases containing hydrogen which comprises subjecting a gas comprising gaseous hydrocarbons to incomplete combustion with only so much of a gas richer in free oxygen than atmospheric air that the resulting mixture still contains an appreciable amount of hydrocarbons, adding steam and then substantially removing the hydrocarbons contained in the gases by passing the said mixture at a temperature of about 600 to 900° C. successively over two different catalysts of which the second has a higher activity than the first, both catalysts assisting the decomposition of methane with steam.

2. The process of producing gases containing hydrogen which comprises subjecting a gas comprising gaseous hydrocarbons to incomplete combustion with only so much of a gas richer in free oxygen than atmospheric air, that the resulting mixture still contains an appreciable amount of hydrocarbons, adding steam and then substantially removing the hydrocarbons contained in the gases by passing the said mixture at a temperature of about 600 to 900° C. first over a less active, but heat resistant catalyst and then over a highly active catalyst, both catalysts assisting the decomposition of methane with steam, and at least the latter assisting also the reaction between carbon monoxide and steam.

3. The process of producing gases containing hydrogen which comprises subjecting a gas comprising gaseous hydrocarbons to incomplete combustion with only so much of a gas richer in free oxygen than atmospheric air that the resulting mixture still contains an appreciable amount of hydrocarbons and then substantially removing the hydrocarbons contained in the gases by passing said hydrocarbons in the presence of steam at a temperature ranging from about 600 to about 900° C. successively over two different catalysts, of which the second has a higher activity than the first, both catalysts assisting the decomposition of methane with steam.

4. The process of producing gases containing hydrogen which comprises subjecting a gas comprising gaseous hydrocarbons to incomplete combustion with only so much of a gas richer in free oxygen than atmospheric air that the resulting mixture still contains an appreciable amount of hydrocarbons, adding steam and then substantially removing the hydrocarbons contained in the gases by passing the said mixture at a temperature of from about 600 to about 900° C. successively over two different catalysts, the first of which is nickel activated with alumina and the second nickel activated with alumina and containing also iron and chromium oxide.

GUSTAV WIETZEL.
WILHELM HALLER.
WILLIAM HENNICKE.